Jan. 8, 1929.
D. DI CARLO
1,698,297
DIRECTION INDICATOR
Filed May 25, 1927
3 Sheets-Sheet 1
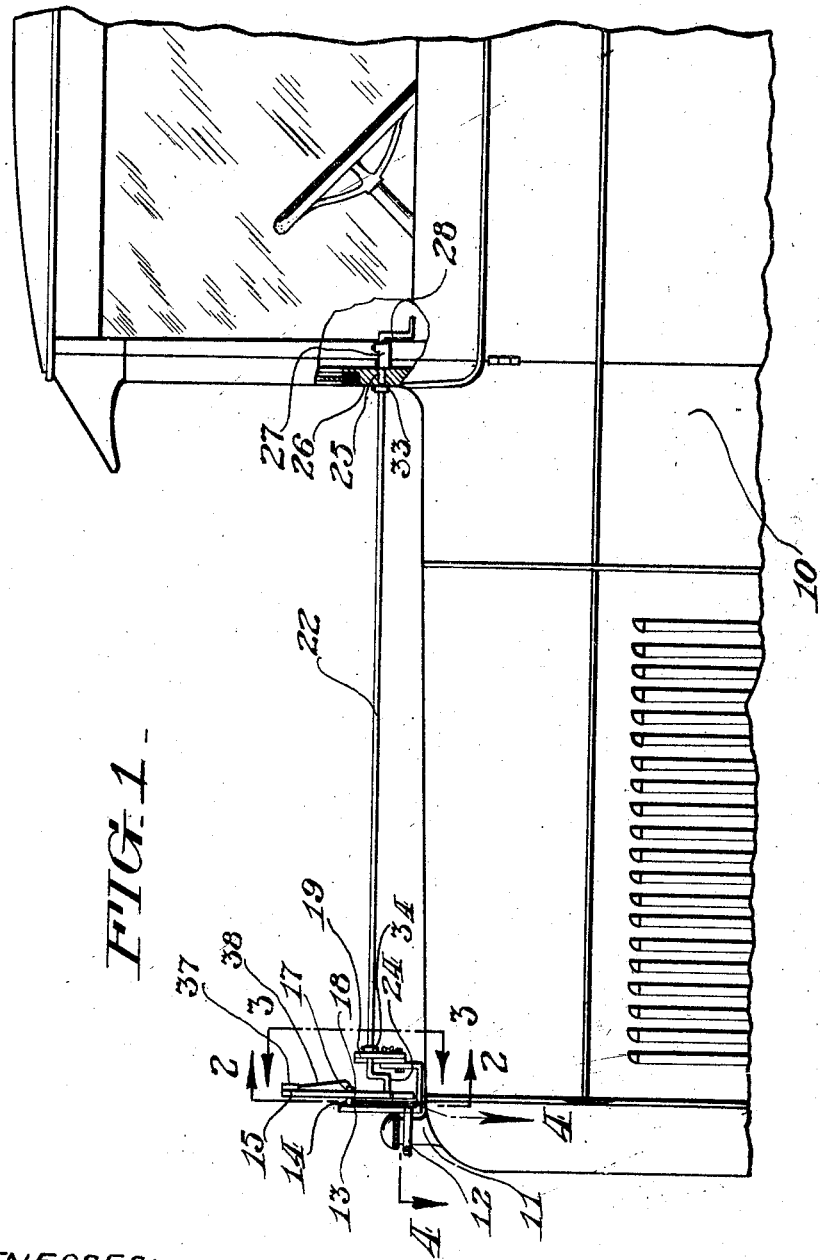
WITNESSES:
Harry C Bright
INVENTOR:
Donato DiCarlo,
BY
ATTORNEY.

Jan. 8, 1929.
D. DI CARLO
1,698,297
DIRECTION INDICATOR
Filed May 25, 1927
3 Sheets-Sheet 2
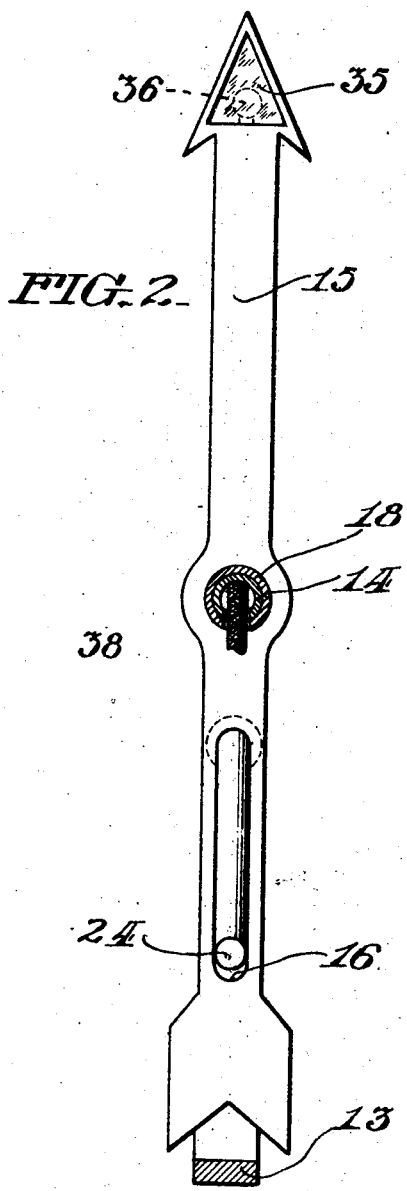
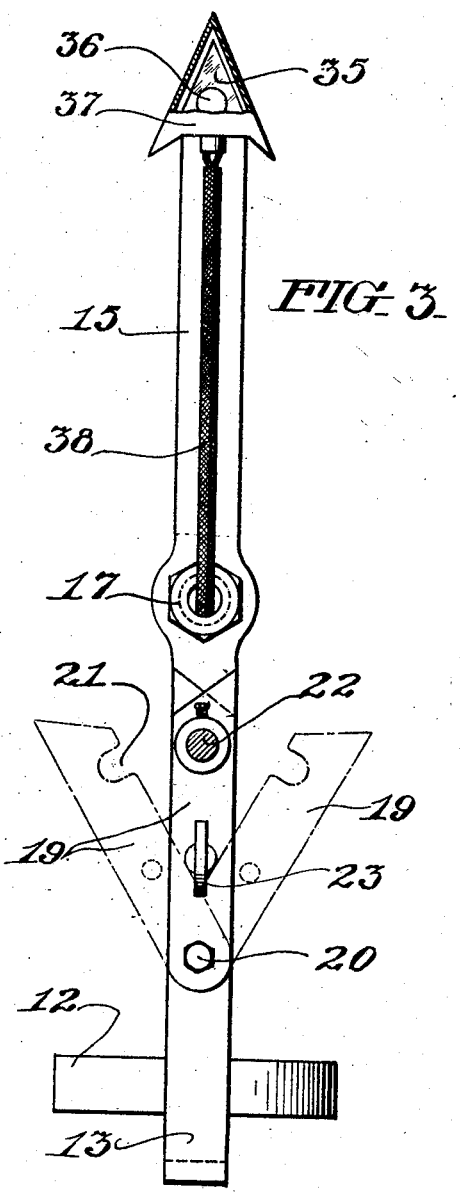
WITNESSES:
Harry C Bright
INVENTOR:
Donato Di Carlo,
BY
ATTORNEY Jan. 8, 1929.

D. DI CARLO 1,698,297

DIRECTION INDICATOR

Filed May 25, 1927

3 Sheets-Sheet 3

WITNESSES:
Harry C Bright

INVENTOR:
Donato Di Carlo,
BY
ATTORNEY.

Patented Jan. 8, 1929.

1,698,297

UNITED STATES PATENT OFFICE.

DONATO DI CARLO, OF PHILADELPHIA, PENNSYLVANIA.

DIRECTION INDICATOR.

Application filed May 25, 1927. Serial No. 193,974.

My invention relates to direction indicators for use on vehicles and has for its object to provide a simple and efficient device which will indicate to pedestrians and the drivers of other vehicles the direction in which the operator of the vehicle intends to turn. A device of this character is particularly advantageous when it is desired to turn a motor vehicle to the right or left in congested districts, in which case it will indicate, to the pedestrians particularly, what course the driver intends to pursue and thus will assist in preventing crossing accidents.

Another object of my invention is to provide an indicating device that may be attached to a motor vehicle in such a way that it will not interfere with the ordinary operation of the vehicle or obstruct access to the parts ordinarily needing attention and inspection.

These objects, and other advantageous ends which will appear hereinafter, I attain in the following manner, reference being had to the accompanying drawings in which Figure 1 is a fragmentary side view of an automobile upon which an embodiment of my invention has been installed, certain parts being broken away.

Figure 4:
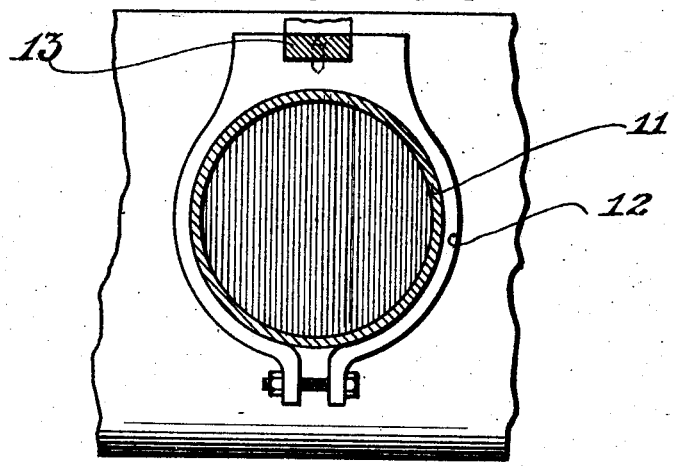

Figure 2 is a front view of the indicating arrow, taken substantially on line 2—2 on Figure 1, Figure 3 a rear view of the indicator taken substantially on line 3—3 on Figure 1, certain parts being broken away, and Figure 4 a sectional plan view taken substantially on line 4—4 on Figure 1.

Figure 5:
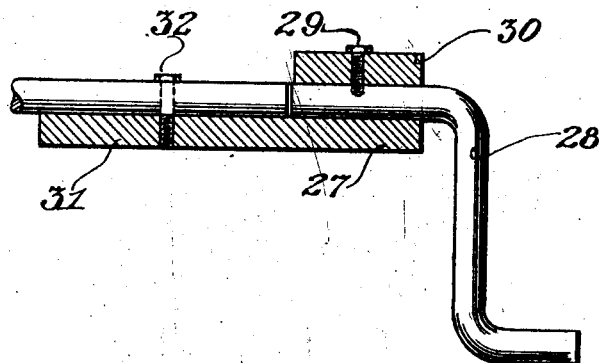
Figure 6:
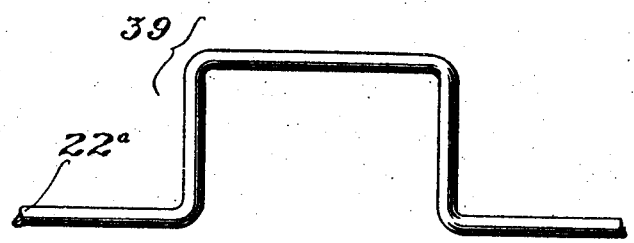

Figure 5 is a central longitudinal sectional view through the coupling which connects the operating handle to the operating shaft and Figure 6 shows a fragment of the operating shaft as it would appear when bent to clear the hood ventilator of an automobile.

Referring now more in detail to the drawings, my invention is shown as being attached to an automobile 10 having a radiator filling tube 11 to which is attached a clamp 12. A substantially U-shaped bracket 13 is secured to clamp 12 and has a hollow bolt 14 secured near the upper end of its longest leg. A pointer 15, preferably shaped like an arrow and having an elongated slot 16 in one end, is mounted for free rotation upon bolt 14 and is held against axial movement thereon by the head 17 of the bolt and a tubular spacer 18 which encircles the bolt and is disposed between bracket 13 and the pointer.

A pair of hinged bearings 19 are pivotally connected to one leg of bracket 13 by means of a bolt 20 and each is provided with a notch 21 which is adapted to form one-half of a bearing for a shaft 22 when aligned with bracket 13; in which position they are held by a thumb screw 23. This arrangement is plainly shown in Figure 3 in which hinged bearings 19 are shown in supporting position in full lines and in opened position by dot-and-dash lines.

A crank 24 is formed on, or attached to, the forward end of shaft 22 and engages slot 16 in pointer 15 so that, as shaft 22 is rotated, pointer 15 may be swung 90° in either direction from a vertical position. Crank 24, slot 16 and bolt 14 are preferably so related that shaft 22 must preferably make approximately a three-eighths turn to cause pointer 15 to make a quarter turn in order to reduce the throw of crank 24. The other end of shaft 22 is adapted to extend through an aperture 25, formed in the windshield frame 26 of the automobile, and has a coupling 27 secured to its inner end and abutting the inside of the windshield frame. A handle 28 is secured in coupling 27 by means of a set screw 29 and is so located, relatively to the driver's seat, that it is easily accessible for manipulation of pointer 15.

Coupling 27 may be of any desired form but has been shown as having an annular portion 30, through which handle 28 extends, and a cut-away portion 31 which is adapted to receive the end of shaft 22. This portion is a little more than semi-circular in cross section and has been cut-away so as to expose the top of shaft 22 in order that a bolt 32 may be inserted through the shaft and threaded into the bottom of cut-away portion 31. This arrangement is plainly shown in Figure 5.

When shaft 22 is rotated by means of handle 28, coupling 27 prevents same from moving forwardly and I also provide a stop collar 33 on shaft 22 which is adapted to abut the outside of windshield frame 26, in which position it is held by a set screw in the usual manner. I have also shown a stop collar 34 on shaft 22 adjacent the rear side of hinged bearings 19 which is held in this position by a set screw in the usual manner. If coupling 27 abuts the inside of windshield frame 26, stop collar 34 is not essential but it is sometimes desired that coupling 27 be spaced from windshield frame 26 and in this case the stop collar is needed.

In order that directions may be plainly indicated at night, I preferably provide a glass 35 in the end of pointer 15 and position an electric lamp 36 directly behind same in a lamp housing 37 secured to the rear side of pointer 15. Electric current is furnished to lamp 36 by wires 38 which are led from lamp 36, into the end of bolt 14, out of the bolt through outlets formed in the sides of the bolt and spacer 18, then through the small apertures usually found where the hood hinge rests on the radiator shell, and connected into the lighting circuit in any desired manner. In order to illustrate the location of wires 38, I have shown lamp housing 37 as covering the rear side of the arrow head alone but, in practice, I preferably extend this housing around the head of bolt 14 in order to conceal these wires.

In approaching a corner around which the driver wishes to turn, he swings pointer 15 to point in the direction he intends to turn and pedestrians crossing the street, drivers of approaching vehicles and traffic police are immediately advised of the intention of the driver so that danger of collision or of striking pedestrians is greatly reduced. Some vehicles are provided with a small ventilator in the cowl just in front of the windshield. If shaft 22 is mounted on the vehicle in close proximity to the top of the hood and cowl, it would prevent the ventilator being opened. To overcome this objection, I provide a shaft 22ª which is identical with shaft 22 except that it has a bent portion 39 of sufficient size to clear the ventilator. This construction is shown in Figure 6 in which a fragment of shaft 22ª is illustrated.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:

1. A direction indicator for vehicles including a bracket adapted to be attached to the front end thereof; a pointer, having an elongated slot in one end, pivotally mounted on the bracket; a shaft journaled in the bracket and in the body of the vehicle; a crank fixed to one end of the shaft and engaging the slot in the pointer; a coupling separably attached to the other end of the shaft and abutting the inside of the body of the vehicle; a stop collar on the shaft and abutting the outside of the body of the vehicle; and a handle attached to the coupling for rotating the shaft.

2. A direction indicator for vehicles including a bracket adapted to be attached to the front end thereof; a pointer pivotally mounted on the bracket; a pair of hinged bearings mounted on the bracket; a crank shaft connected to the pointer and journaled in the hinged bearings and in the body of the vehicle; stop collars on the crank shaft for holding same against axial movement; and a handle separably connected to the crank shaft for rotating same and swinging the pointer to indicate a direction.

3. A direction indicator for vehicles including a bracket adapted to be attached to the front end thereof; a bolt secured in the bracket; a pointer pivotally mounted on the bolt and having an elongated slot; a spacer on the bolt between the pointer and the bracket; hinged bearings mounted on the bracket; a crank shaft journaled in the bearings and in the body of the vehicle; a crank on the crank shaft engaging the slot in the pointer; means for holding the crank shaft against axial movement; and a handle secured to the crank shaft for rotating same.

In testimony whereof I have signed my name to this specification.

DONATO DI CARLO.